C. J. GARNER.
LOCK.
APPLICATION FILED NOV. 13, 1916.
1,283,493.
Patented Nov. 5, 1918.
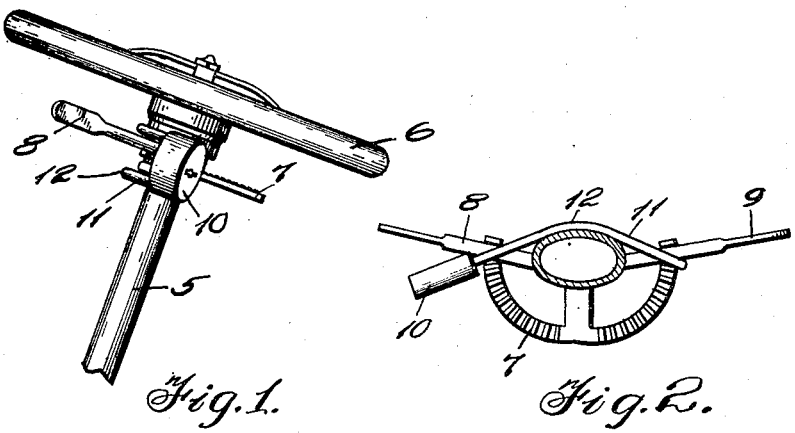
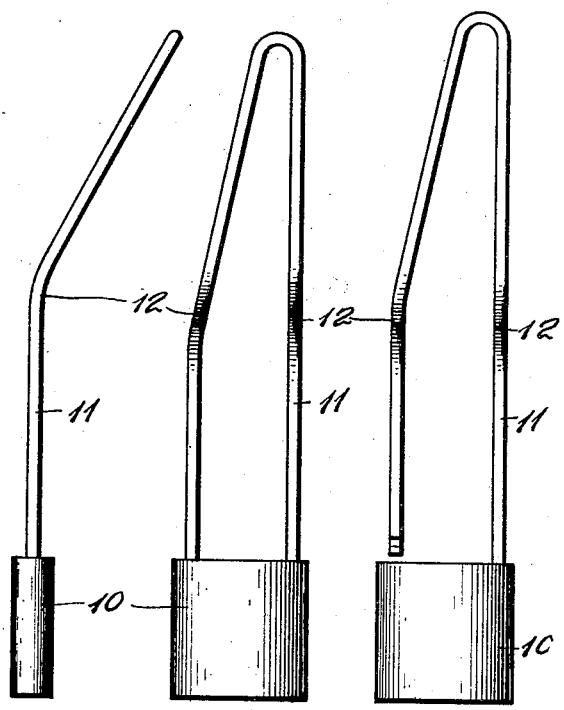
Fig. 3. Fig. 4. Fig. 5.
Inventor
Charles J. Garner,
By Norman J. Whitaker
his Attorney

UNITED STATES PATENT OFFICE.

CHARLES J. GARNER, OF WASHINGTON, DISTRICT OF COLUMBIA.

LOCK.

1,283,493.  Specification of Letters Patent.  Patented Nov. 5, 1918.

Application filed November 13, 1916. Serial No. 131,176.

*To all whom it may concern:*

Be it known that I, CHARLES J. GARNER, a citizen of the United States, and resident of Washington, in the District of Columbia, have invented new and useful Improvements in Locks, of which the following is a specification.

My invention relates to locks, and more particularly to a lock for the locking spark and throttle levers of an automobile to prevent the same from being stolen or used by unauthorized persons.

The primary object of my present invention is to provide a lock for embracing the spark and throttle levers of an automobile which will positively prevent either one of the levers from being moved.

Another object of this invention is to provide a lock of the above mentioned type which may be quickly and easily engaged or disengaged from the spark and throttle levers of the automobile.

A further object of the invention is to provide a lock for locking two relatively movable levers, preferably the spark and throttle levers of an automobile which may be effectively used in connection with almost any conventional structure that is now in use.

An additional object is to provide a lock of the above mentioned type which is simple in construction, which consists of few parts, is inexpensive to manufacture and which may be placed on the market at a comparatively low cost.

With the above and other objects and advantages in view, the invention consists of the constructions, combinations and arrangement of parts which will be hereinafter set forth in detail in the following specification and illustrated in the accompanying drawings, in which:

Figure 1 shows a side view of a conventional steering column and wheel, and showing my invention in operative position thereon, Fig. 2 is a transverse sectional view through the steering column and showing my improved lock applied to the spark and throttle levers of an automobile, the lock and levers being shown in elevation, Fig. 3 is a side elevation of my improved lock, Fig. 4 is a front elevation of the same, and Fig. 5 is a like view, showing the free end of the shackle disengaged from the lock.

Like characters of reference indicate like parts in all the views.

Referring to the drawings, the numeral 5 designates the usual steering column of an automobile having the usual steering wheel 6 mounted thereon. The numeral 7 designates a quadrant which is mounted on the steering column, and 8 and 9 the spark and throttle levers respectively. This structure above set forth, is conventional, and as it forms no part of the present invention, a further mention of these parts is deemed unnecessary.

Rotatably connected with the lock proper, which is indicated by the numeral 10 is one end of a substantially U-shaped shackle designated at 11. This U-shaped shackle is bent as at 12 and extended obliquely with respect to the longitudinal axis of the U-shaped shackle. From the bend 12, the free end of the shackle is extended obliquely with respect to the longitudinal axis of the obliquely extending portion of the end of the U-shaped shackle that is connected with the lock 10.

The free end of the shackle 11 is provided with the usual notched end to be received in an opening to be inserted and engaged with the lock proper.

In applying my lock to lock the levers 8 and 9 against movement, the forward end thereof is engaged about one of the levers at a point where it will engage the quadrant, and the lock proper is engaged with the lever 8 and the free end of the shackle is engaged therewith.

From the foregoing description, it will be seen that I have provided a locking device that will positively prevent unauthorized persons using an automobile having the device applied thereto.

While, what is now believed to be the best embodiment of my invention, it is to be understood that the same may be changed in various details and modified in many different respects that may fairly fall within the scope of the appended claim.

What I claim is:—

In a device of the character described, the combination with a lock, of a substantially U-shaped shackle comprising a pair of legs, each of said legs being bent intermediate the ends thereof, one of said legs being longer than the other and rotatably connected with said lock, substantially one-half of the shorter of said legs lying in a plane parallel to the longer leg, the other half of the shorter leg being angularly disposed with respect to the first mentioned half of said shorter leg.

CHARLES J. GARNER.

Copies of this patent may be obtained for five cents each, by addressing the "Commissioner of Patents, Washington, D. C."